United States Patent [19]

Mochizuki

[11] Patent Number: 5,502,698
[45] Date of Patent: Mar. 26, 1996

[54] AUTOMATIC ATTITUDE CORRECTING SYSTEM FOR OPTICAL DISC DEVICE

[75] Inventor: Masaki Mochizuki, Yokohama, Japan

[73] Assignee: Victor Company of Japan, Ltd., Yokohama, Japan

[21] Appl. No.: 310,226

[22] Filed: Sep. 21, 1994

[30] Foreign Application Priority Data

| Sep. 22, 1993 | [JP] | Japan | 5-259186 |
| Nov. 5, 1993 | [JP] | Japan | 5-299154 |
| Dec. 13, 1993 | [JP] | Japan | 5-341945 |

[51] Int. Cl.$^6$ .................................................. G11B 7/00
[52] U.S. Cl. ........................... 369/44.32; 369/44.35; 369/50
[58] Field of Search ............... 369/44.32, 44.28, 369/44.29, 50, 47, 44.35, 44.36, 54, 44.27, 44.34; 360/77, 77.03, 77.04, 77.06

[56] References Cited

U.S. PATENT DOCUMENTS

| 4,052,741 | 10/1977 | Baca et al. | 360/77.08 |
| 4,527,263 | 7/1985 | Nakagawa | 369/44.32 |
| 5,228,020 | 7/1993 | Shiragami et al. | 369/50 |

FOREIGN PATENT DOCUMENTS

| 0552764 | 7/1993 | European Pat. Off. . |
| 0554087 | 8/1993 | European Pat. Off. . |
| 0558293 | 9/1993 | European Pat. Off. . |
| 62-99924 | 5/1987 | Japan . |
| 1-199329 | 8/1989 | Japan . |
| 1-199326 | 8/1989 | Japan . |
| 3-242832 | 10/1991 | Japan . |
| 4-45315 | 4/1992 | Japan . |

OTHER PUBLICATIONS

"A Method For Auto Focus Positioning Adjustment Of Optical Disc Drive" presented to the 1990 Optical Memory Symposium held on Jul. 9, 1990 at Makuhari–Messe, Japan by Katsuya Watanabe et al. of Matsushita Electric. (English abstract is included in the paper).

Yoshihide Nakashima et al. "86mm Magneto-optical Disc Drive" SPIE vol. 1316, Optical Data Storage (1990), pp. 16–29. (written in English).

Kyosuke Yoshimoto et al. "Compensation Method Of Focusing Servo Of Optical Disk Drives", Conference Digest of Topical Meeting of Optical Data Storage (Mar. 1990), pp. 14–17. (written in English).

*Primary Examiner*—Aristotelis Psitos
*Assistant Examiner*—Thang V. Tran
*Attorney, Agent, or Firm*—Michael N. Meller

[57] ABSTRACT

According to an automatic attitude correcting system of this invention, correction signals which are used to reduce control errors through a focus control, a tracking control, a tilt control, etc. are determined by measuring the amplitude of an RF reproduction signal reproduced from an optical disc at a predetermined area. For setting a correction signal value to be supplied to an attitude control mechanism such as an attitude control mechanism, a scanning signal whose signal level varies with time variation is supplied to a control mechanism driving circuit. The scanning signal varies in level at every one-revolution of the optical disc, and the amplitude of the RF reproduction signal is outputted from the optical head at every one-revolution of the optical disc, and measured at a predetermined angle for each level of the scanning signal. The maximum value is detected on the basis of the plural amplitude values thus measured, and the scanning signal value providing the maximum value is determined as a correction signal to be used in a reproducing operation. Therefore, in the reproducing operation, the control error of the control mechanism is excellently suppressed with the correction signal.

14 Claims, 10 Drawing Sheets

AUTOMATIC ATTITUDE CORRECTING SYSTEM FOR OPTICAL DISC DEVICE

BACKGROUND OF THE INVENTION

1. Field of the Invention

This invention relates to an automatic attitude correcting system for use in an optical disc device for reproducing information from an optical disc.

2. Description of Related Art

In a reproducing operation of an optical disc on which information tracks are spirally or concentrically formed, if recording density of the optical disc is low, no problem would occur to the reproduction even when the control accuracy of control mechanisms containing an optical system including an optical head in its focus control, tracking control, tilt control, etc. is relatively low, and further no critical problem would occur even when an RF reproduction signal outputted from the optical head is deteriorated. The deterioration of the RF reproduction signal means deterioration in frequency characteristics, SN ratio, jitter, symmetry of waveforms, and the like.

If the recording density is high, the control accuracy of the control mechanisms is required to be considerably high, and the deterioration of the RF reproduction signal is required to be limited. However, actually, if the positional relationship between the optical disc and the optical head for reading the recorded information from the optical disc is not accurately kept, the RF reproduction signal outputted from the optical disc is degraded, so that high precision control cannot be performed.

For example, when tracking control is conducted, an objective lens of the optical head is shifted (displaced) in a radial direction of the optical disc (this shift is called "lens shift"), and during this lens shift, the optical axis of a laser beam emitted from a laser source toward a disc surface is not necessarily aligned with the center of the lens, and this error of alignment causes false signals to be generated and superposed on a focus error signal representing an out-of-focus amount of the objective lens, and on a tracking error signal representing the deviation of the laser beam from the center of a track, etc., so that no high-precision control can be performed.

Further, it is preferable that the optical axis of the laser beam is perpendicular to the surface of the optical disc. However, actually, when loading accuracy of the optical disc into an optical disc recording and/or reproducing apparatus is low or when the surface of the optical disc has a runout, the optical disc is inclined (no longer perpendicular) to the optical axis of the laser beam (hereinafter referred to as "tilt"), and thus false signals are generated and are liable to be superposed on the focus error signal, the tracking error signal, etc., so that the high-precision control cannot be performed, and the degradation of the RF reproduction signal increases.

Further, in order to reproduce an optical disc having high recording density, it is required to use an optical head with an optical system having a higher optical cut-off frequency. The use of such an optical head makes the requirement tighter for focus error tolerance, off-track tolerance, inclination (tilt) between the optical axis of a laser beam and an optical disc, etc. Accordingly, a focus error, an off-track amount and the tilt must be adequately limited. In this case, the most significant issue is that, in the control mechanisms, an operation point at which an error signal is minimum is not coincident with an operation point at which a reproduced RF signal (RF reproduction signal) becomes maximum. This is caused by occurrence of a DC (direct current) offset in a control error signal due to a mounting error of a control photodetector, deviation as aged, variation of temperature, etc.

In order to solve the above problems, automatic attitude corrections including positional correction are performed on the optical disc device before or during the reproduction of the optical disc. In this automatic attitude correction system, correction signals are first detected in the optical disc device to offset (cancel) the false signals, and this detected correction signals are supplied to the optical disc device at all times during the reproducing operation of the optical disc to offset the false signals.

That is, in the automatic attitude correction as described above, suitable correction signals are applied to the control mechanisms containing the optical system of the optical head for the focus control, the tracking control, the tilt control, etc., and the optimum values of these correction signals are determined or altered before or at a suitable time during the reproduction of the optical disc to maximize the amplitude of the RF reproduction signal outputted from the optical head.

Various kinds of automatic attitude correcting devices have been hitherto proposed for optical disc devices. As one type of these automatic attitude correcting devices, an automatic focus adjusting device has been proposed as disclosed in the Japanese Laid-open Patent Application No. 1-199326/1989. In this automatic focus adjusting device, a coil of a focus actuator for moving a lens is forcibly supplied with a correction signal current to move the lens. During the movement of the lens, the correction signal current is positively varied to measure the amplitude of the RF reproduction signal outputted from the optical head and set the value of the current so that the amplitude of the RF reproduction signal becomes maximum, and with this set value, the optical head is fixed.

Further, as another type of these automatic attitude correcting devices has been proposed as an automatic tilt correcting system for correcting an angle between an optical disc and an optical head as disclosed in the Japanese Laid-open Patent Application No. 1-199329/1989. In this automatic tilt correcting system, the amplitude of the RF reproduction signal is observed while positively varying the angle of the optical head to the surface of the optical disc, and the tilt angle of the optical head is controlled so that the amplitude becomes maximum. Further, in another type of automatic tilt correcting system as disclosed in the Japanese Laid-open Utility Model Application No. 4-45315/1992, the amount of jitter of the RF reproduction signal is observed while positively varying the angle of the optical head to the surface of the optical disc, and such a correction signal that the jitter amount becomes minimum is detected to correct the title angle of the optical head.

An optical disc involves generally various factors which disturb stability of the amplitude and jitter of RF reproduction signals, such as dust, scratches thereon, uneven thickness of a transparent substrate thereof, unevenness of refractive index of material, tilt (warp, runout) of the surface of an optical disc, etc. Therefore, in the conventional correcting methods for optical disc devices as described above, information recorded in an area having dust and scratches on the optical disc is reproduced with noises due to such dust and scratches, and thus when the RF reproduction signal for the information is utilized for attitude controls, accurate correction signals cannot be obtained.

In other words, in the automatic attitude correcting devices for the optical disc device, the values of correction signals which are calculated with reproduction signals reproduced from specific areas on the optical disc are not necessarily utilized as correction values for effectively correcting the other areas. That is, in some cases, these correction values are greatly deviated from optimum values (values of correction signals) in accordance with the rotational angle of the optical disc, and thus the amplitude of the RF reproduction signal may be greatly reduced.

In addition to the above problems, there is a problem that addition of a correction signal causes an increase of the maximum value of a residual control error.

On the other hand, in a method that an optimum correction signal value is detected in accordance with each of plural rotational angles on the optical disc and a correction signal is determined on the basis of the plural correction signal values thus detected, an operation of calculating the optimum correction signal value at every angle is required, and particularly when a correction value is calculated on the basis of an estimation calculation using a function approximation at every angle, a large load is imposed on a CPU, so that it becomes difficult to correct a correction value during a reproducing operation.

SUMMARY OF THE INVENTION

An object of the present invention is to provide an automatic attitude correcting system of an optical head for an optical disc device, which is capable of performing automatic attitude correction of the optical head without being disturbed by dust, scratches, etc. on an optical disc, thereby reducing a control error of the optical head.

Another object of the present invention is to provide an automatic attitude correcting system for an optical disc device in which when a correction signal is supplied to an attitude control mechanism for the optical disc device, the value of a correction signal is prevented from being greatly deviated from the optimum value over the whole rotational angle of the optical disc, thereby performing an excellent automatic attitude correction.

Further object of the present invention is to provide an automatic attitude correcting system for an optical disc device, which is capable of reducing the load on a CPU to control the attitude of the optical head when a correction signal to be supplied to an attitude control mechanism is set, and limiting the maximum value of a residual control error of the attitude control mechanism to be a small value to thereby perform an excellent automatic attitude correction, and in which additional correction of the correction signal can be easily performed even during a reproducing operation.

In order to attain the above objects, according to a first aspect of the present invention, an automatic attitude correction system for an optical disc device serves to automatically correct control mechanisms containing an optical head so that the optical disc device is operated in its best condition, and it is improved in detection of a correction signal to be supplied to an attitude control mechanism.

That is, the automatic attitude correction system for an optical disc device in which an optical disc is reproduced with an optical head assembly including a lens attitude control mechanism for controlling the attitude of a lens of an optical head, rotation synchronizing signal generating means for outputting a signal at one-rotational angle of the optical disc, scanning signal generating means for supplying the lens attitude control mechanism with a scanning signal whose DC level varies stepwise at a predetermined interval, amplitude detection means for detecting an amplitude of the output of the optical head in synchronization with the output of the rotation synchronizing signal generating means, and correction value calculating means for calculating the value of the correction signal when the output of the amplitude detection means is maximum, on the basis of the output of the amplitude detection means, the amplitude of a reproduction signal from the same area or an adjacent area on the optical disc being detected by the amplitude detection means.

In an optical disc device, as a defocus amount, a tilt amount or an off-track amount is increased, the amplitude of the RF reproduction signal outputted from the optical head is reduced.

According to the automatic attitude correcting system of the first aspect of the present invention, correction signals which are used to reduce control errors of the focus control, the tracking control, the tilt control, etc. are determined by measuring the amplitude of an RF reproduction signal which is reproduced from the same area or adjacent areas on the optical disc with every correction signal. That is, a scanning signal whose signal level varies with time increment is supplied to a control mechanism driving circuit. The scanning signal is a DC voltage, and its level varies every revolution of the optical disc. The amplitude of the RF reproduction signal which is outputted from the optical head at every revolution of the optical disc is measured.

This measurement is made by reading out information at the same rotational phase angle of the same or adjacent information track, and thus there is no abnormality of a measured value due to dust or scratch on the optical disc insofar as no abnormality such as dust, scratch or the like are present at this area on the optical disc. Further, the maximum value is detected on the basis of the plural amplitude values thus measured, and the value of a scanning signal which provides the maximum value is determined as a correction signal to be used in a reproducing operation. Therefore, in the reproducing operation, the control error of the control mechanism is considerably suppressed.

Still further, it is judged on the basis of the amplitude variation of the RF reproduction signal whether a measurement point (reproduction area) is abnormal, and if it is determined as an abnormal area, the measurement point is shifted to make a measurement at an area where no abnormality such as dust, scratch or the like are present. Therefore, a high-precision correction value can be detected.

Further, in order to attain the above objects, an automatic attitude correcting system according to a second aspect of the present invention is a system for supplying a correction signal to a lens control mechanism for controlling a relative positional relationship between an optical disc and an objective lens of an optical head so that the optical disc device excellently operates over the whole rotational angle of the optical disc, thereby performing an automatic attitude correction, and it is improved in detection of a correction signal to be supplied to a lens control mechanism.

That is, the automatic attitude correcting system for an optical disc device in which an optical disc is reproduced with an optical head, includes a lens control mechanism for controlling the relative positional relationship between the objective lens of the optical head and the optical disc, scanning signal generating means for supplying the lens control mechanism with a scanning signal whose DC level varies with a time increment, amplitude detection means for detecting the amplitude of the output of the optical head at every predetermined rotational angle at a substantially constant radius position of the optical disc, and correction value calculating means for calculating the value of a correction signal maximizing the output of the amplitude detection means on the basis of the output of the amplitude detection means at every predetermined rotational angle, the correction signal based on the correction value for each predetermined rotational angle which is calculated by the correction value calculating means, is supplied to the lens control mechanism.

Further, the automatic attitude correcting system also includes a lens control mechanism for controlling the relative positional relationship between an objective lens of an optical head and an optical disc, scanning signal generating means for supplying the lens control mechanism with a scanning signal whose DC level varies with a time increment, revolution amplitude detection means for detecting the amplitude of the output of the optical head over substantially one revolution of the optical disc at every output value of the scanning signal generating means, and correction value calculating means for calculating the value of a correction signal maximizing the output of the revolution amplitude detection means on the basis of the output of the revolution amplitude detection means, the correction signal based on the correction value which is calculated by the correction value calculating means being supplied to the lens control mechanism.

According to the automatic attitude correcting system of the second aspect of the present invention, each of the correction signals which are supplied to the lens control mechanism for the focus control, the tracking control, the tilt control, etc. is determined by measuring the amplitude of an RF reproduction signal at a predetermined angular position of the disc, obtained by dividing one complete circle of the optical disc in equal parts, and supplied to the lens control mechanism.

When the value of the correction signal to be supplied to the lens control mechanism is set, the scanning signal whose signal level varies stepwise with a time increment is supplied to a control mechanism driving circuit. The level of the scanning signal is revised little by little in synchronization with a reference phase signal every time the optical disc is rotated one revolution, and in each level of the scanning signal, the amplitude of the RF reproduction signal outputted from the optical head is measured at the predetermined rotational angle of the disc.

This measurement is made over a wide rotational phase angle in an area having a substantially same radius on the optical disc, so that a measurement result is approximated to that obtained using an RF reproduction signal substantially over the whole rotational angle.

Further, the correction signal to be supplied to the lens control mechanism in the reproducing operation of the optical disc is determined on the basis of the plural amplitude values thus measured, so that the operation of the lens control mechanism is corrected by the correction signal in the reproducing operation of the optical disc, and a high quality reproduction signal can be obtained over the whole rotational angle of the optical disc.

Still further, in order to attain the above objects, according to a third aspect of the present invention, an automatic attitude correcting system for an optical disc device is a system for supplying a correction signal to an attitude control mechanism for controlling the relative positional relationship between an objective lens of an optical head and an optical disc to thereby perform an automatic attitude correction, and it is improved in setting of a correction signal to be supplied to the attitude control mechanism.

That is, the automatic attitude correcting system for an optical disc device in which an optical disc is reproduced with an optical head, includes an attitude control mechanism for controlling the relative positional relationship between the objective lens of the optical head and the optical disc, residual error monitoring means for judging whether an AC component of a control error signal in the attitude control mechanism is substantially equal to zero, scanning signal generating means for supplying the attitude control mechanism with a scanning signal whose DC level varies stepwise, amplitude detection means for detecting the amplitude of the output of the optical head, and correction value calculating means for calculating the value of a correction signal maximizing the output of the amplitude detection means on the basis of the output of the amplitude detection means, and supplying it to the attitude control mechanism, the amplitude of the reproduction signal being detected by the amplitude detection means when it is judged on the basis of the output of the residual error monitoring means that the AC component of the control error signal is substantially equal to zero, thereby reducing the maximum value of the residual control error of the attitude control mechanism.

Further, the automatic attitude correcting system of the third aspect of the present invention also includes an attitude control mechanism for controlling the relative positional relationship between an objective lens of an optical head and an optical disc, scanning signal generating means for supplying the attitude control mechanism with a scanning signal whose DC level varies stepwise, amplitude detection means for detecting the amplitude of the output of the optical head, residual error detection means for detecting an AC component of a control error signal in the attitude control mechanism when the amplitude detection is conducted in the amplitude detection means, and correction value calculating means for calculating a correction signal on the basis of a scanning signal maximizing the output of the amplitude detection means and the output of the residual error detection means and supplying it to the correction value calculating means, thereby reducing the maximum value of the residual control error of the attitude control mechanism.

As described above, in the optical disc device, the amplitude of the RF reproduction signal outputted from the optical head is reduced as the defocus amount, the tilt amount or the off-track amount is increased. According to the automatic attitude correcting system of the third aspect of the present invention, each of the correction signals to be supplied to the attitude control mechanism for the focus control, the tracking control, the tilt control, etc. is set in a state where the AC component of the control error signal of the attitude control mechanism is substantially equal to zero.

That is, at each level (step) of the scanning signal, the amplitude of the RF reproduction signal when the AC component of the control error signal is substantially equal to zero is measured, and the scanning signal value providing the maximum amplitude is detected or calculated as a correction signal and supplied to the attitude control mechanism.

Alternatively, at each level of the scanning signal, the amplitude of the RF reproduction signal and the residual control error when the amplitude is sampled, are measured. On the basis of these data, the scanning signal value maximizing the amplitude of the RF reproduction signal is detected or calculated, and the value corresponding to the residual control error is subtracted from the scanning signal value thus detected (calculated) to obtain the correction signal and it is supplied to the attitude control mechanism.

Accordingly, the correction signal has no residual control error, and even when the residual control error varies in the reproducing operation, the correction signal varies with an operation point (where the residual control error is substantially equal to zero) at the center. Therefore, there can be prevented occurrence of a case where the maximum value of the residual control error is rather increased due to addition of the correction signal, and the maximum value of the residual control error of the optical system control mechanism can be reduced.

DETAILED DESCRIPTION OF THE PREFERRED EMBODIMENTS

Preferred embodiments according to this invention will be described with reference to the accompanying drawings.
[FIRST EMBODIMENT]

A first embodiment of an automatic attitude correcting system for an optical disc device will be described with reference to FIGS. 1 and 2.

Figure 1:
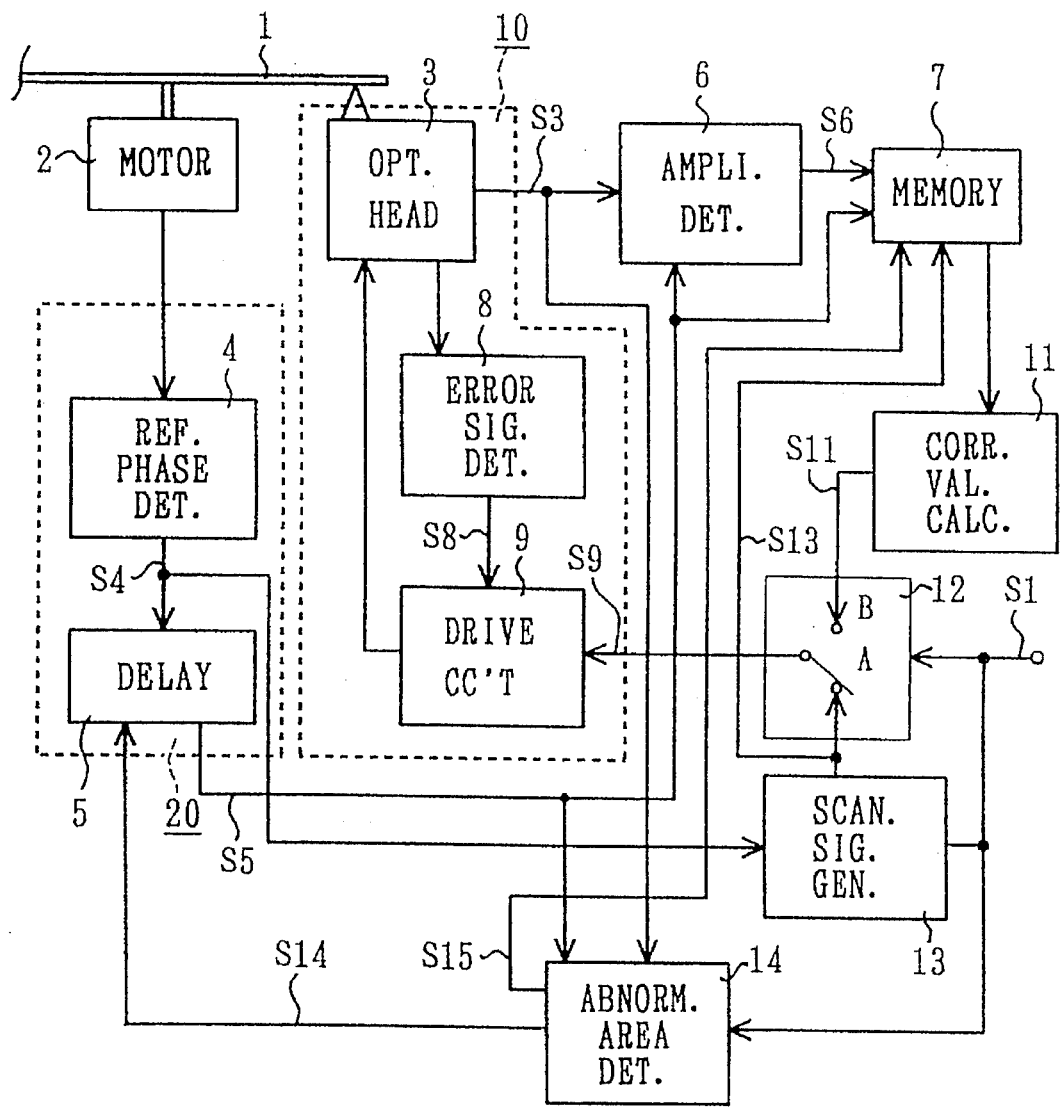
FIG. 1 is a block diagram showing a first embodiment of an automatic attitude correcting system for an optical disc device according to this invention.

FIG. 1 is a block diagram showing an automatic attitude correcting system of the first embodiment. In FIG. 1, an optical disc 1 on which information tracks are spirally or concentrically formed is rotated by a motor 2, and information is reproduced from the optical disc 1 with a laser beam projected from an optical head 3. The optical head 3 contains an optical system having a lens (not shown), a laser source (not shown), etc., a mechanical system for moving the lens, a photodetector (not shown) for receiving light which is reflected from an optical disc surface and focused.

The laser beam emitted from the laser source of the optical head 3 is focused by the objective lens in the optical head 3 so that a beam spot is formed on the surface of the optical disc. The objective lens is moved in a direction perpendicular to the surface of the optical disc by a focus actuator (not show) to thereby perform the focus control.

Further, the tracking control is performed so that the beam spot is displaced in a direction across the information tracks on the optical disc. The tracking control is performed using a tracking error signal which corresponds to a relative positional deviation of the beam spot from a center of the track while the objective lens is moved in a radial direction of the optical disc by a tracking actuator (not shown).

In addition, the tilt control is performed so as to keep the optical axis of the laser beam perpendicular to the surface of the optical disc. This tilt control is performed by detecting a tilt signal corresponding to the deviation (tilt) of the optical axis of the laser beam on the basis of the output of the photodetector or the like, and controlling the angle of the whole optical head or inclination of the objective lens.

A focus error signal, a tracking error signal, a tilt signal, etc. are detected by an error signal detection unit 8, and the focus actuator, the tracking actuator and a tilt correction mechanism are driven on the basis of the above signals by a control mechanism driving circuit 9. In the following description, the focus control is exemplary described. It is assumed in the following description that the focus error signal is outputted from the error signal detection unit 8, and a focus control current is supplied from the control mechanism driving circuit 9 to a coil of the focus actuator of the optical head 3 in accordance with the focus error signal.

In FIG. 1, From the reference phase detection unit 4, a reference phase signal S4 is outputted at a specific rotational angle of the motor 2 or the optical disc 1. The signal S4 is outputted once per one revolution of the optical disc.

The reference phase signal S4 is supplied to a delay circuit 5, and the reference phase signal S4 is delayed by a time corresponding to a delay amount control signal S14 in the delay circuit 5. The reference phase detection unit 4 and the delay circuit 5 comprise a rotational synch signal generator 20. A delay signal S5 which is an output of the rotational synch signal generator 20 is supplied to an amplitude detection unit 6, a memory 7 and an abnormal area detection unit 14.

The amplitude of an RF reproduction signal outputted from the optical head 3 is sampled and held in synchronization with the delay signal S5 in the amplitude detection unit 6, and the value S6 thus held is stored in the memory 7.

In the error signal detection unit 8, a control error signal S8 is detected on the basis of the output of the photodetector (not shown) of the optical head 3 or the signal from the error detection device (not shown) which is provided in the optical head.

The optical head 3, the error signal detection unit 8 and the control mechanism driving circuit 9 constitute an attitude control mechanism 10 for controlling the attitude of the lens or alternatively an attitude of the attitude control mechanism 10 itself.

In this embodiment, the control error signal S8 is a focus error signal which represents other error signals as well, is detected on the basis of the output of the photodetector of the optical head 3, and it is supplied to the control mechanism driving circuit 9. The coil of the focus actuator is supplied with a control current in accordance with the focus error signal S8 from the control mechanism driving circuit 9.

The distance between the objective lens of the optical head 3 and the surface of the optical disc 1 is controlled in the manner as described above, and the laser beam emitted from the laser source is controlled so as form a beam spot having a minimum diameter on the optical disc at all times.

When correction is made in the automatic attitude correcting system, a signal S9 to be inputted to the control mechanism driving circuit 9 is a scanning signal which is outputted from the scanning signal generating unit 13.

The scanning signal S13 is a DC voltage, and its level is updated every one-revolution of the optical disc 1. For example, for automatic correction for the focus control, a correction signal S11, explained later, to be applied to the control mechanism driving circuit 9 after the correcting operation is determined so that the diameter of the beam spot on the optical disc becomes minimum and the amplitude of the RF reproduction signal becomes maximum in a state where the control error signal S8 is equal to zero.

When automatic attitude correction of the optical disc device is carried out, an area of the optical disc 1 on which any abnormality due to scratches, dust or the like is present, is detected by the abnormal area detection unit 14. Further, when an RF reproduction signal which is reproduced from the abnormal area of the optical disc 1 is stored in the memory 7 on the basis of the delay signal S5, the rotational angle at which the amplitude of the RF reproduction signal is sampled is revised by the delay amount control signal S14, and at the same time the memory 7 is reset with a signal 215 outputted from the abnormal area detection unit 14, whereby a correction signal S11 which will be explained later, is produced from a correction value calculating unit 11.

That is, in the abnormal area detection unit 14 which is supplied with the delay signal S5 outputted from the delay circuit, the RF reproduction signal S3 outputted from the optical head 3 and a correction start signal S1, a rotational angle at which any abnormal area exists is detected on the basis of a variation of an envelope of the signal S3. When the timing of the delay signal S5 is within the rotational angle at which the abnormal area exists, the delay amount control signal S14 is revised to change the delay amount in the delay circuit 5, and the memory 7 is cleared.

The operation of the automatic attitude correcting system shown in FIG. 1 will be described with reference to FIGS. 1 and 2.

Figure 2:
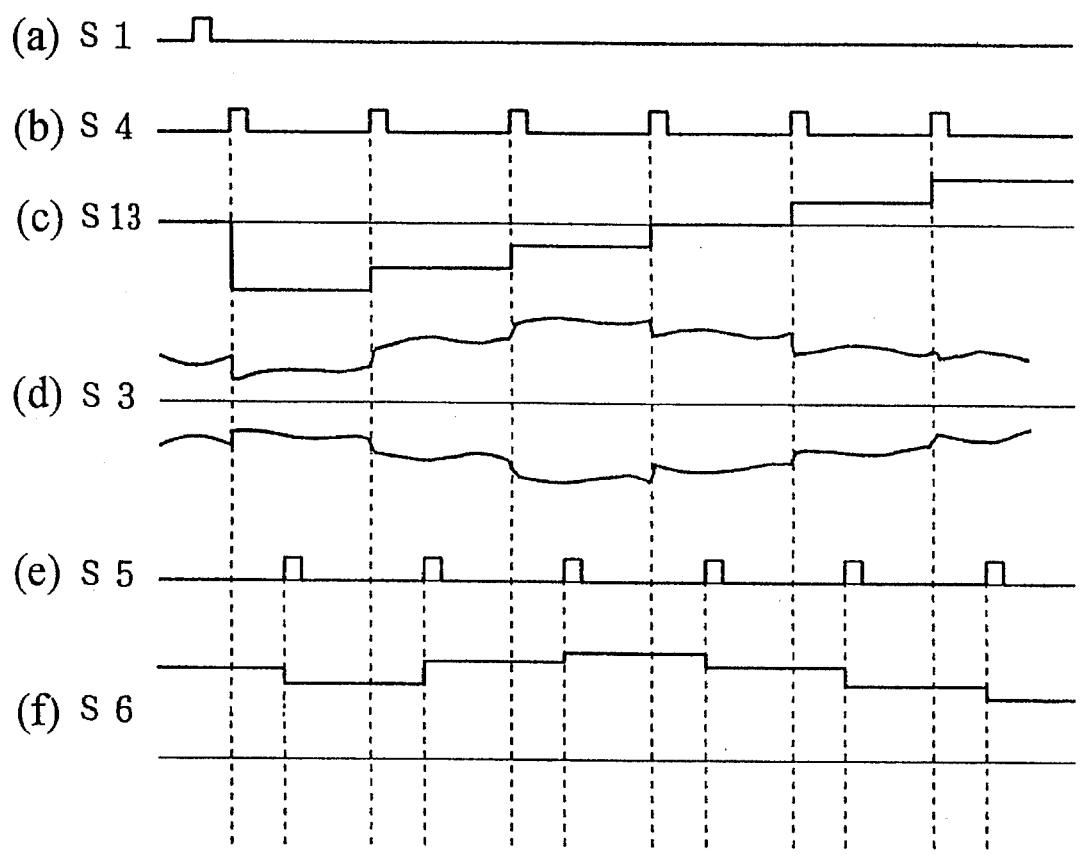
FIG. 2 is a time chart showing a signal of each part of the automatic attitude correcting system shown in FIG. 1.

FIG. 2 is a time chart for signals of respective parts of the automatic attitude correcting system shown in FIG. 1.

In the optical disc device for reproducing the optical disc 1, the automatic attitude correction is performed before or during a reproducing operation. The automatic attitude correction is started with the automatic correction start signal S1, a switch 12 is switched to an A-side, the memory 7 is reset, and the scanning signal S13 is supplied to the control mechanism driving circuit 9 as the signal S9. Further, during the automatic attitude correction, the reproduction of the same track (in case of still picture reproduction) on the optical disc 1 is repeated by the optical head 3.

The scanning signal S13 is varied in synchronization with the reference phase signal S4. That is, the amplitude or polarity of the scanning signal S13 is altered at a predetermined fixed rotational angle of the optical disc 1.

The delay circuit 5 is supplied with the delay amount control signal S14 indicating a prescribed delay time, and the reference phase signal S4 is delayed by a prescribed delay time to output the delay signal S5.

In the amplitude detection unit 6, the amplitude of the RF reproduction signal S3 is detected in synchronization with the delay signal S5, and stored in the memory 7. At this time, the value of the scanning signal S13 is also stored in the memory 7. In FIG. 2, the envelope of the RF reproduction signal is shown as S3.

Through the above operation, the memory 7 is stored with the amplitude value of the RF reproduction signal which corresponds to each level of the scanning signal S13. The value of the scanning signal stored in the memory 7 and the amplitude of the RF reproduction signal which corresponds to the scanning signal value are supplied from the memory 7 to the correction value calculating unit 11.

In the correction value calculating unit 11, the maximum value among a plurality of amplitude values of the RF reproduction signals is detected by calculation of know method, and a scanning signal value corresponding to the detected maximum value of the RF reproduction signals is determined and outputted to a terminal B of the switch 12 as the correction signal S11. In this case, there would be no problem if the level of the scanning signal S13 is varied by a small enough step amount in the scanning signal generating unit 13. However, if the step amount (difference between steps) is large and the number of the steps is small, a function approximation is performed using these values. That is, an approximate function to which a small number of data are conformed is determined by a known method, and the correction signal value which causes the maximum value of the RF reproduction signal is estimated from the determined approximate function.

On the other hand, the abnormal area detection unit 14 is supplied with the RF reproduction signal S3 on the same track at all times. The envelope of the signal S3 is detected, and in an area where an amplitude of differentiated waveform of the envelope exceeds a predetermined amplitude value, the signal is judged to be a reproduction signal from the abnormal area on the optical disc 1.

Further, when the angular position of the optical disc 1 at which the delay signal S5 is outputted is included within an angular range of the optical disc indicating the abnormal area, the value of the delay amount control signal 814 is altered, and the amplitude of the RF reproduction signal is detected again to detect (or calculate) the optimum correction signal S11.

However, when no abnormal area is detected by the abnormal area detection unit 14, no alteration is conducted on the delay time.

When the correction signal S11 is determined, the output terminal of the switch 12 is switched to a B-side. During the reproducing operation of the optical disc device, the detected correction signal S11 is supplied to the control mechanism driving circuit 9 at all times, and the control error of the optical disc device due to various factors is cancelled, so that the focus control can be accurately performed.

In the above description, the focus control is performed exemplary by the error signal detection unit 8, the optical head 3 and the control mechanism driving circuit 9. The tracking control and the tilt control are performed in the same manner.

Further, the automatic correcting operation is not necessarily conducted in the still picture reproduction state, it may be performed over plural tracks in the normal reproducing operation. Further, the detection of the abnormal area by the abnormal area detection unit 14 may be performed before the detection of the amplitude of the RF reproduction signal by the amplitude detection unit 6.

According to the automatic attitude correcting system of the present invention, the automatic correction can be performed without being affected by scratches, dust, etc. on the optical disc. Therefore, the control errors generally associated to various kinds of automatic control systems for the optical heads, etc. can be considerably limited.

[SECOND EMBODIMENT]

A second embodiment of the automatic attitude correcting system according to this invention will be described with reference to FIGS. 3 to 7.

Figure 3:
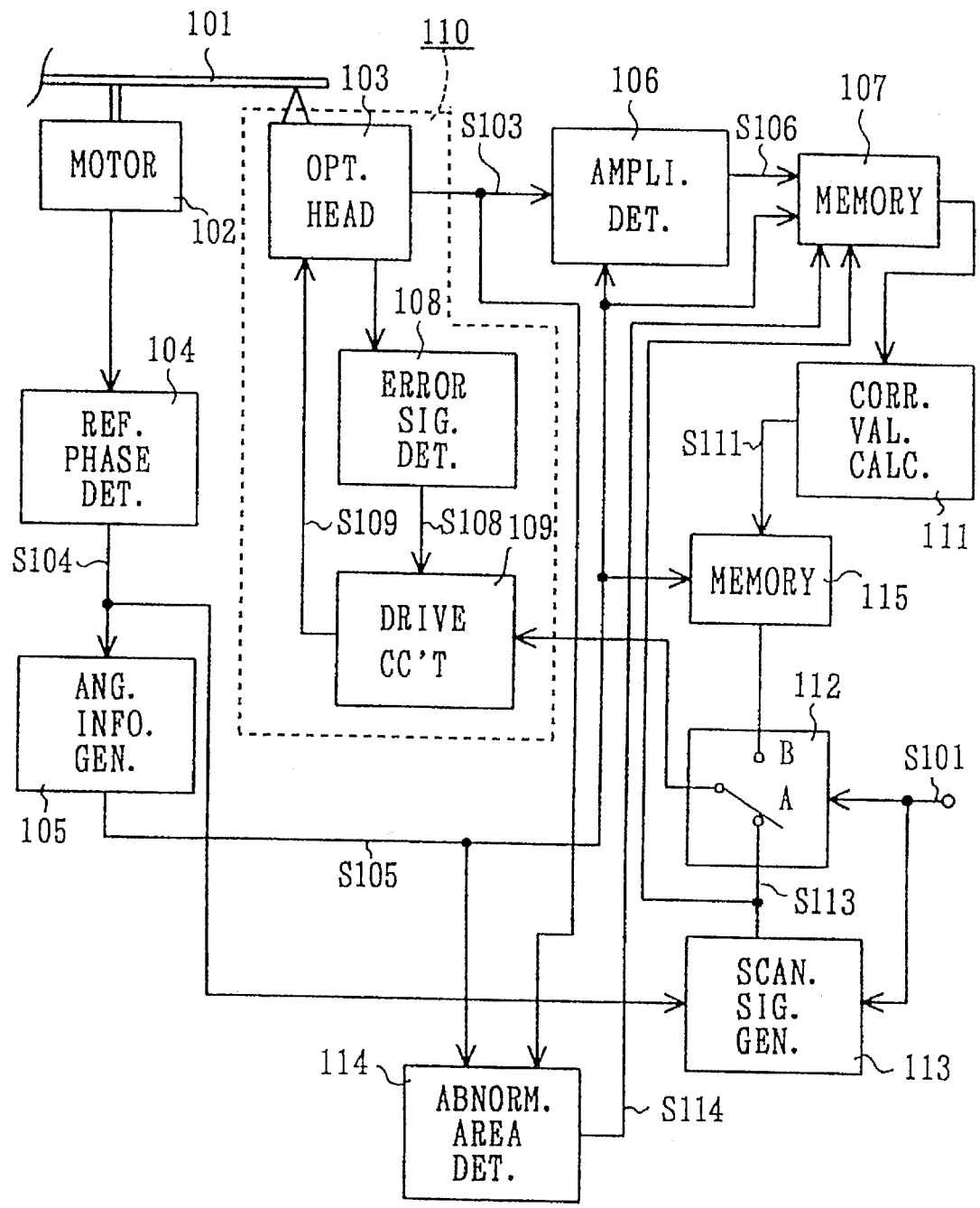
FIG. 3 is a block diagram showing a second embodiment of the automatic attitude correcting system for an optical disc device according to this invention.

FIG. 3 is a block diagram showing the second embodiment of the present invention.

In FIG. 3, an optical disc 101 on which information tracks are spirally or concentrically formed is rotated by a motor 102, and the information is optically reproduced from the optical disc 101 with a laser beam emitted from a laser source (not shown) in an optical head 103. The optical head 103 has an optical system containing a laser source (not shown), an objective lens (not shown), etc., a mechanical system (not shown) for moving the lens, a photodetector (not shown) for detecting light reflected from the optical disc 101, etc.

The laser beam emitted from the laser source of the optical head 103 is focused by the objective lens in the optical head so that a beam spot is formed on the optical disc 101. The objective lens is moved in a direction perpendicular to the surface of the optical disc by a focus actuator (not shown)) to thereby perform the focus control.

Further, the tracking control is performed so that the beam spot is displaced in a direction across center lines of the information tracks on the optical disc 101. The tracking control is performed by utilizing a tracking error signal which corresponds to a relative positional deviation of the beam spot from the center of track while the objective lens is moved in a radial direction of the optical disc 101 by a tracking actuator (not shown).

In addition, a tilt control is performed so that an optical axis of the laser beam becomes perpendicular to the surface of the optical disc. This tilt control is performed by detecting a tilt error signal corresponding to a deviation (tilt) of the optical axis of the laser beam from the norm on the basis of the output of the photodetector or the like, and altering the angle of the whole optical head or inclining the objective lens.

A focus error signal, the tracking error signal, the tilt error signal, etc. are detected by an error signal detection unit 108, and the focus actuator, the tracking actuator and a tilt correction mechanism are driven on the basis of the above signals in a control mechanism driving circuit 109, respectively.

In the following description, a case where the focus control is performed by a lens control mechanism (not shown) will be described. In the focus control, a focus error signal is outputted from the error signal detection unit 108, and a coil of the focus actuator in the optical head 103 is supplied with a current in accordance with the focus error signal in the control mechanism driving circuit 109.

In FIG. 3, a reference phase signal S104 is outputted at every predetermined angular position of the motor 102 or the optical disc 101 from a reference phase detection unit 104. In other words, the reference phase signal S104 is outputted once per one complete revolution of the optical disc 101, and supplied to an angular information generating unit 105.

Figure 7:
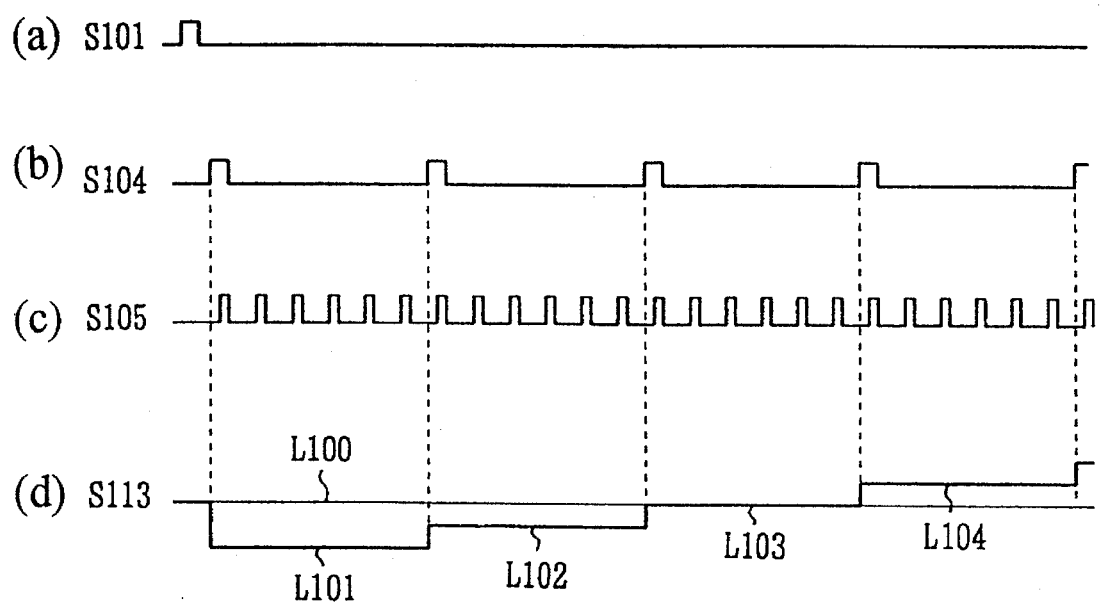
FIG. 7 is a time chart of each signal.

From an angular information generating unit 105, an angular signal S105 indicating a rotational angle of the motor 102 or the optical disc 101, is outputted at a predetermined rotational angle thereof, and supplied to an abnormal area detection unit 114, an amplitude detection unit 106 and a memory 107. The predetermined rotational angle corresponds to each of six rotational angles of the optical disc 101 which are determined with an angular interval of 60° with respect to the reference phase signal, for example, 15° 75°, 135°... The time chart for these signals S104 and S105 denoted in FIG. 3 is shown in FIG. 7.

In FIG. 3, when a correction signal for the automatic attitude correction is determined, the optical disc device is set in a still picture reproduction mode or a normal reproduction mode. Upon an input of an automatic correction start signal S101, a switch 112 is switched to an A-side, and through the switch 112 a scanning signal S113 generated by a scanning signal generating unit 113 and shown in FIG. 7 is fed to the memory 107. The level of the scanning signal S113 is varied at a prescribed step difference in synchronization with the reference phase signal S104 at every one-revolution of the optical disc 101.

In the amplitude detection unit 106, the amplitude of the RF reproduction signal outputted from the optical head 103 is sampled and held in synchronization with the angular signal S105, and an amplitude value S106 from the amplitude detection unit is stored in the memory 107. For example, the amplitude value S106 is stored at every rotational angular interval of 60° thus a total of six amplitude values are stored during one revolution of the motor 2 for one level (step) of the scanning signal.

The error signal detection unit 108 detects the control error signal S108 on the basis of the output of the photodetector of the optical head 103 or the signal from the error detection device which may be provided in the optical head 103.

The optical head 103, the error signal detection unit 108 and the control mechanism driving circuit 109 constitute an attitude control mechanism 110 for controlling the relative attitude of the objective lens or the attitude control mechanism 110 itself with respect to the optical disc 101.

In this embodiment, the control error signal S108 is exemplary a focus error signal which is detected on the basis of the output from the photodetector of the optical head 103, and it is supplied to the control mechanism driving circuit 109. From the control mechanism driving circuit 109, a current S109 corresponding to the focus error signal S108 is supplied to the driving coil of the focus actuator.

The distance between the objective lens of the optical head 103 and the optical disc 101 is controlled as described above, and in the normal reproducing operation the laser beam emitted from the laser source is controlled to form a beam spot having a minimum diameter on the optical disc at all times.

In FIG. 3, upon input of the automatic correction start signal S101 to the switch 112 and the scanning signal generating unit 113, the optimum correction signal value to be supplied to the attitude control mechanism 110 in the reproducing operation of the optical disc 101 is calculated. In this case, the switch 112 is switched to the A-side, and the scanning signal S113 outputted from the scanning signal generating unit 113 is inputted to the control mechanism driving circuit 109.

As shown in FIG. 7, the scanning signal S113 is a signal whose voltage is varied in steps like L101, L102, L103, ... as time progresses, and its level is varied in synchronization with the reference phase signal S104 at every one-revolution of the optical disc 101.

In the amplitude detection unit 106, the amplitude of the RF reproduction signal S103 is first detected at every predetermined rotational angle in synchronization with the angular signal S105 for the level L101 of the scanning signal S113, and then stored in the memory 107. The memory 107 is also supplied with the scanning signal S113 and the output signal of the abnormal area detection unit 114.

Subsequently, the level of the scanning signal S113 is altered. Then, in the amplitude detection unit 106, the amplitude of the RF reproduction signal S103 is detected at every predetermined rotational angle in synchronization with the angular signal S105, and then stored in the memory

107. Subsequently to the above operation, in the same manner as described above, the amplitude of the RF reproduction signal S103 is detected at every predetermined rotational angle for each level of the scanning signal S113 and then stored in the memory 107.

The level of the scanning signal, the angular information of the optical disc 101 i.e. the angular signal S105 and the amplitude of the RF reproduction signal S103 are stored in combination in the memory 107, and its content is supplied to a correction value calculating unit 111. Like in the correction value calculating unit 11 in the first embodiment, on the basis of these signal data supplied to the correction value calculating unit 111, the level of the scanning signal S113 which maximizes the amplitude of the RF reproduction signal S103 is detected by the same known calculation method at every predetermined rotational angle of the optical disc 101, and each of the levels of the scanning signal S113 which are detected at every predetermined rotational angle in the manner as described above, is stored in a memory 115 as a correction signal S111 for each predetermined rotational angle of the optical disc 101, accordingly the calculation of the correction values is completed.

In the reproducing operation, the switch 112 is switched to the B-side, and the correction signal S111 stored in the memory 115 is supplied to the control mechanism driving circuit 109 of the attitude control mechanism 110 at every predetermined rotational angle.

For determination of the optimum correction signal value at every predetermined rotational angle of the optical disc 101, if the step difference of the scanning signal S113 is fairly small, the correction signal value is determined from predetermined level values of the scanning signal 113 which are determined beforehand. However, if the step difference of the scanning signal 113 is large in the correction value calculating unit 111, the estimating operation, like in the correction value calculating unit 11 in the first embodiment, is conducted through the function approximation on the basis of the detected amplitude values to calculate a correction value with higher precision. In this case, there are some cases where the optimum correction value at a rotational angle is different from the predetermined level of the scanning signal which is set previously.

In the reproducing operation of the optical disc 101, the correction value which is stored in the memory 115 is supplied through the switch 112 to the control mechanism driving circuit 109 at every predetermined angle. That is, the optimum correction signal is supplied to the control mechanism driving circuit 109 at every predetermined rotational angle.

When the correction signal is set in the automatic attitude correcting system of the optical disc device, an abnormal area where any abnormality due to scratches, dust or the like on the optical disc 101 is present, is detected by an abnormal area detection unit 114. Thereafter, when the amplitude value of an RF reproduction signal which is outputted from the abnormal area is stored in the memory 107 in synchronization with the angular signal S105, the RF amplitude value at the rotational angle of the area is not used for the calculation of the correction value, and in place of the above correction value for the abnormal area as described above, a correction value which is obtained for a normal area just before the abnormal area is detected and stored in the memory 115.

The abnormal area detection unit 114 is supplied with the angular signal S105 and the RF reproduction signal S103, and a rotational angle of the optical disc 101, at which any abnormal area is present, is detected on the basis of a fluctuation rate of the envelope of the signal S103. When the timing of the angular signal S105 is within the rotational angle at which the abnormal area is present, this area is judged to be an abnormal area.

According to the second embodiment of this invention shown in FIG. 3, the optimum values of a correction signal are determined for each of the predetermined angles obtained by dividing one circle of the optical disc to a predetermined number of sectors, and supplied to the attitude control mechanism 110, so that the correction can be effectively performed over the whole circle of the optical disc 101.

In the scanning signal generating unit 113, a median L100 between the maximum and minimum levels of the scanning signal is set to a predetermined value in the above description. However, it may be altered on the basis of a correction value which is determined in a previous correction value setting. That is, similar optical characteristics are obtained between tracks insofar as these tracks are located close each other. Therefore, if the correction value which is set in the previous correction value setting is used as the median L100, there occurs no risk that the attitude control mechanism is out of a controllable area during the correction value setting, and the precision of the correction signal can be improved by reducing the step difference of the scanning signal. Further, it is sufficient to perform the detection of the amplitude of the RF reproduction signal for only the scanning signal level which is adjacent to the median L100. Therefore, the correction signal can be calculated at a high speed.

[THIRD EMBODIMENT]

Next, a third embodiment of the automatic attitude correcting system of this invention will be described with reference to FIG. 4.

Figure 4:
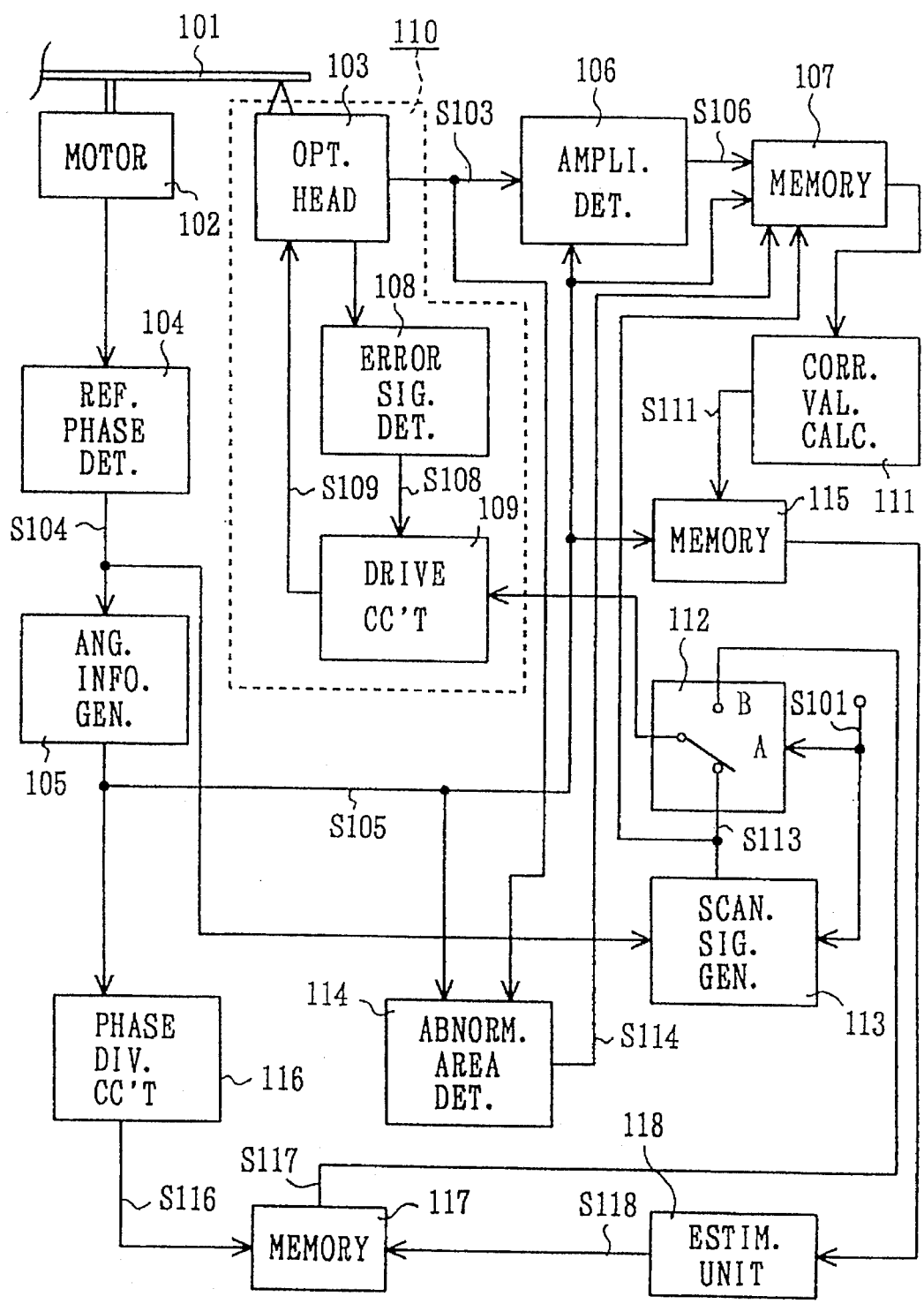
FIG. 4 is a block diagram showing a third embodiment of the automatic attitude correcting system for an optical disc device according to this invention.

FIG. 4 is a block diagram showing the third embodiment of the automatic attitude correcting system according to the present invention. In FIG. 4, the same elements having the same functions as shown in FIG. 3 are represented by the same reference numerals, and the description thereof is omitted.

The third embodiment shown in FIG. 4 is identical to the first embodiment except that a phase dividing circuit 116, a memory 117 and an estimating unit 118 are provided.

In FIG. 4, in the optical disc device for reproducing the optical disc 101, the value of the correction signal as described above is set before or during the reproducing operation. The setting of the correction signal value is started with the automatic correction start signal S101, the switch 112 is switched to the A-side, the memory 107 is reset, and the scanning signal S113 is supplied to the control mechanism driving circuit 109.

Further, during the setting of the correction signal, the reproduction of the same track (still picture reproduction) of the optical disc 101 is repeated by the optical head 103.

In the third embodiment shown in FIG. 4, the level of the scanning signal S113, the angular information S105 and the amplitude value S106 of the RF reproduction signal all stored in the memory 115, are supplied in combination to the estimating unit 118.

Further, the frequency of the angular signal S105 is multiplied in the phase division circuit 116, and for example, the signal S105 is outputted at every 60° rotational angle of the optical disc 101 while the signal S116 is outputted at every 15° rotational angle of the optical disc 101. These outputs are supplied to the memory 117.

In the estimating unit 118, the correction value at a timing at which the signal S116 is outputted is estimated by a known function approximation method on the basis of the correction value (the value of the correction signal) at a timing at which the signal S105 is outputted, that is, at a predetermined rotational angle. The result is stored in the memory 117.

After all the correction signal values are calculated in the manner as described above, the correction values thus calculated are supplied from the memory 117 to the control mechanism driving circuit 109 through the switch 112 in synchronization with the signal S116.

In this method, in order to shorten a time required for detecting the optimum correction value for each predetermined rotational angle of the optical disc 101 in synchronization with the angular signal S105, the predetermined rotational angle is set to a relatively large value, a relatively high precision correction signal can be supplied to the control mechanism driving circuit 109 even at rotational angles which are other than the predetermined rotational angles.

[FOURTH EMBODIMENT]

A fourth embodiment of the automatic attitude correcting system according to the present invention will be described with reference to FIG. 5.

Figure 5:
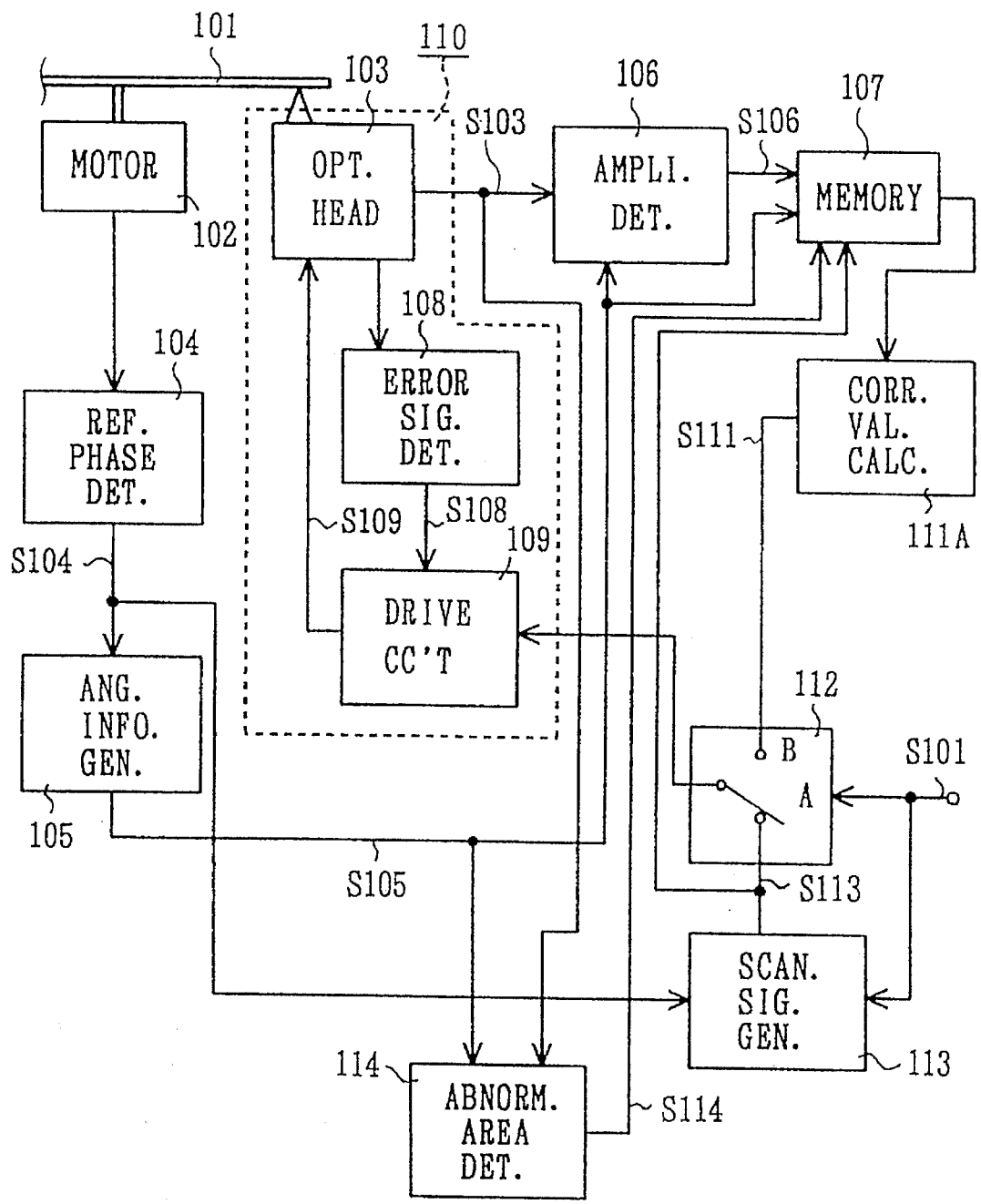
FIG. 5 is a block diagram showing a fourth embodiment of the automatic attitude correcting system for an optical disc device according to this invention.

FIG. 5 is a block diagram showing the fourth embodiment. In FIG. 5, those elements which have the same construction and functions as shown in FIG. 3 are represented by the same reference numerals, and the description thereof is omitted.

The fourth embodiment of FIG. 5 is different from the second embodiment in only the fact that the content of the memory 107 is supplied to a correction value calculating unit 111A, and a correction signal S111 outputted from the correction value calculating unit 111A is supplied to the switch 112 without being passed through the memory 115 (FIG. 3).

The data stored in the memory 107 are identical to those of the second embodiment.

In the correction value calculating unit 111A, one correction value is calculated with the output of the memory 107, and in the reproducing operation, the calculated one correction value is supplied through the switch 112 to the control mechanism driving circuit 109 irrespective of the rotational angle of the optical disc 101.

The one correction value calculated in the correction value calculating unit 111A is an average value of all correction values for the respective predetermined rotational angles which are outputted from the memory 107, or an arithmetical mean value of the maximum and minimum values of the correction values for the respective predetermined rotational angles.

According to the correction value thus calculated, no alteration is performed on the correction value in accordance with the rotational angle of the optical disc 101. Although no alterations are made corresponding to the angular positions of the optical disc 101, there is no possibility that the correction signal greatly deviates from the optimum value at any rotational angle of the optical disc 101. In addition, the circuit construction can be simplified because the correction signal does not need to be altered in accordance with the rotational angle.

[FIFTH EMBODIMENT]

A fifth embodiment of the automatic attitude correcting system according to this invention will be described hereunder with reference to FIG. 6.

Figure 6:
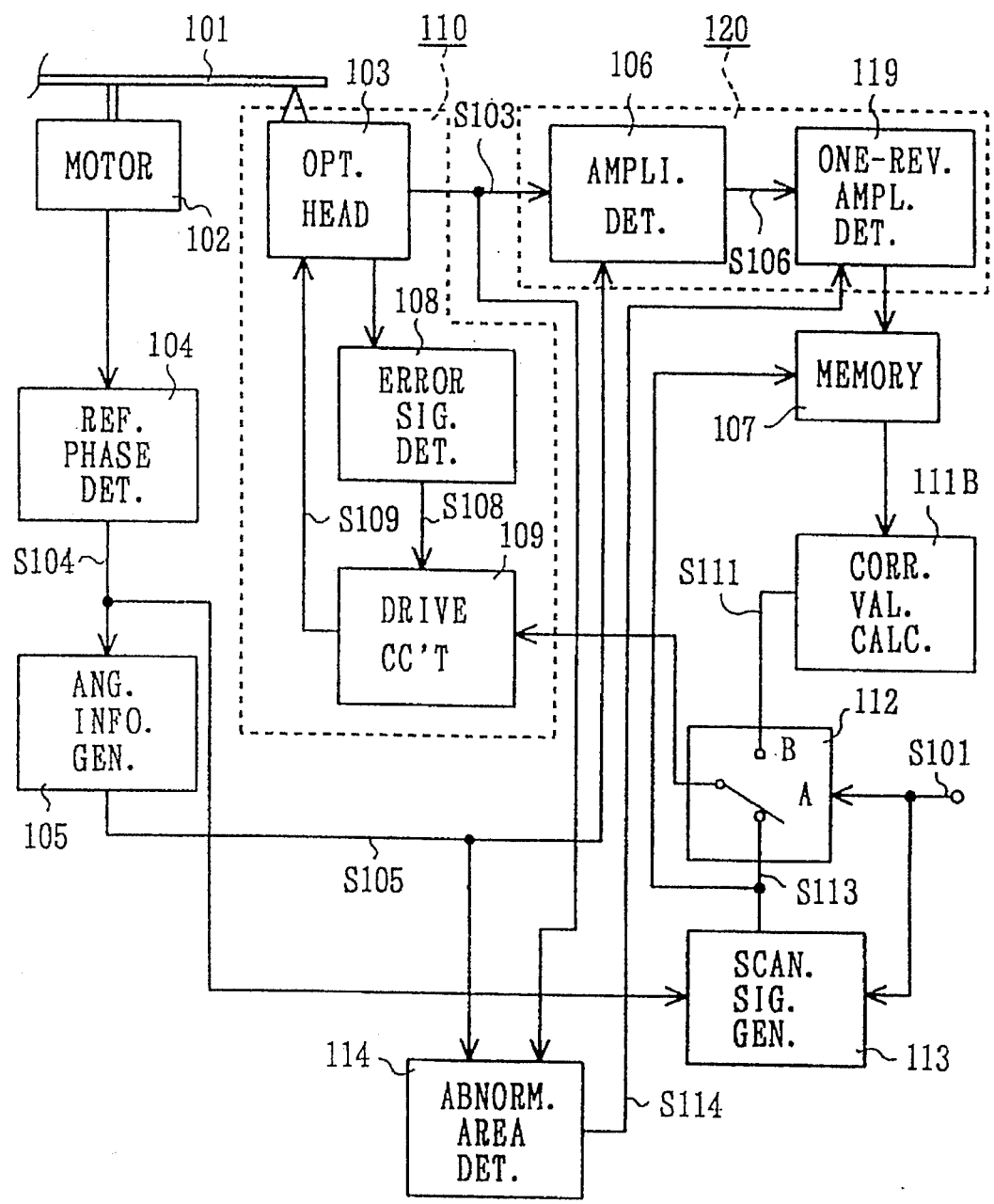
FIG. 6 is a block diagram showing a fifth embodiment of the automatic attitude correcting system for an optical disc device according to this invention.

FIG. 6 is a block diagram showing the fifth embodiment according to the present invention.

In FIG. 6, those elements which have the same construction and functions as shown in FIG. 3 are represented by the same reference numerals, and the description thereof is thus omitted.

In the fifth embodiment, the amplitude of an RF reproduction signal from one track turn of spiral or concentric information tracks of the optical disc 101 (hereinafter referred to as "one-revolution amplitude") is detected by a one-revolution amplitude detection unit 120 comprising an amplitude detection unit 106 and a one-revolution amplitude detector 119, and the amplitude value thus detected is stored in the memory 107. The amplitude detection is carried out with every level step of the scanning signal S113.

For example, when the level of the scanning signal S113 is L101 shown in FIG. 7, the amplitude of the RF reproduction signal S103 at a predetermined rotational angle during one-revolution of the optical disc 101 is detected by the amplitude detection unit 106. The average value of, for example, six amplitude values which are detected during the one-revolution of the optical disc 101 is calculated as an amplitude value of this track turn, that is, a one-revolution amplitude value by the one-revolution amplitude detector 119, and then stored in the memory 107. Likewise, one-revolution amplitude values are calculated from the RF reproduction signal S103 for the other levels of the scanning signal.

The one-revolution amplitude value for each level of the scanning signal S113 is supplied to the correction value calculating unit 111B, and one correction value is calculated on the basis of the data of the one-revolution amplitude value in the correction value calculating unit 111B.

After the one correction value is determined, the correction value is supplied to the control mechanism driving circuit 109 irrespective of the rotational angle of the optical disc 101. The one correction value as described above is selected from the predetermined levels of the scanning signal S113 which causes the one-revolution amplitude value to become maximum, or determined through an estimation using the function approximation described before.

According to the fifth embodiment as described above, the calculation of the optimum value of the correction signal is carried out only once, so that the setting of the correction signal value can be performed at a high speed.

According to the automatic attitude correcting system of the second to fifth embodiments, the automatic correction of the attitude control mechanism can be excellently performed over the whole revolution of the optical disc, and thus the amplitude of the RF reproduction signal from a high-density optical disc can be prevented from being greatly reduced which may otherwise occur depending on the angular position of the optical disc.

[SIXTH EMBODIMENT]

A sixth embodiment of the automatic attitude correcting system for the optical disc according to the present invention will be described with reference to FIG. 8.

Figure 8:
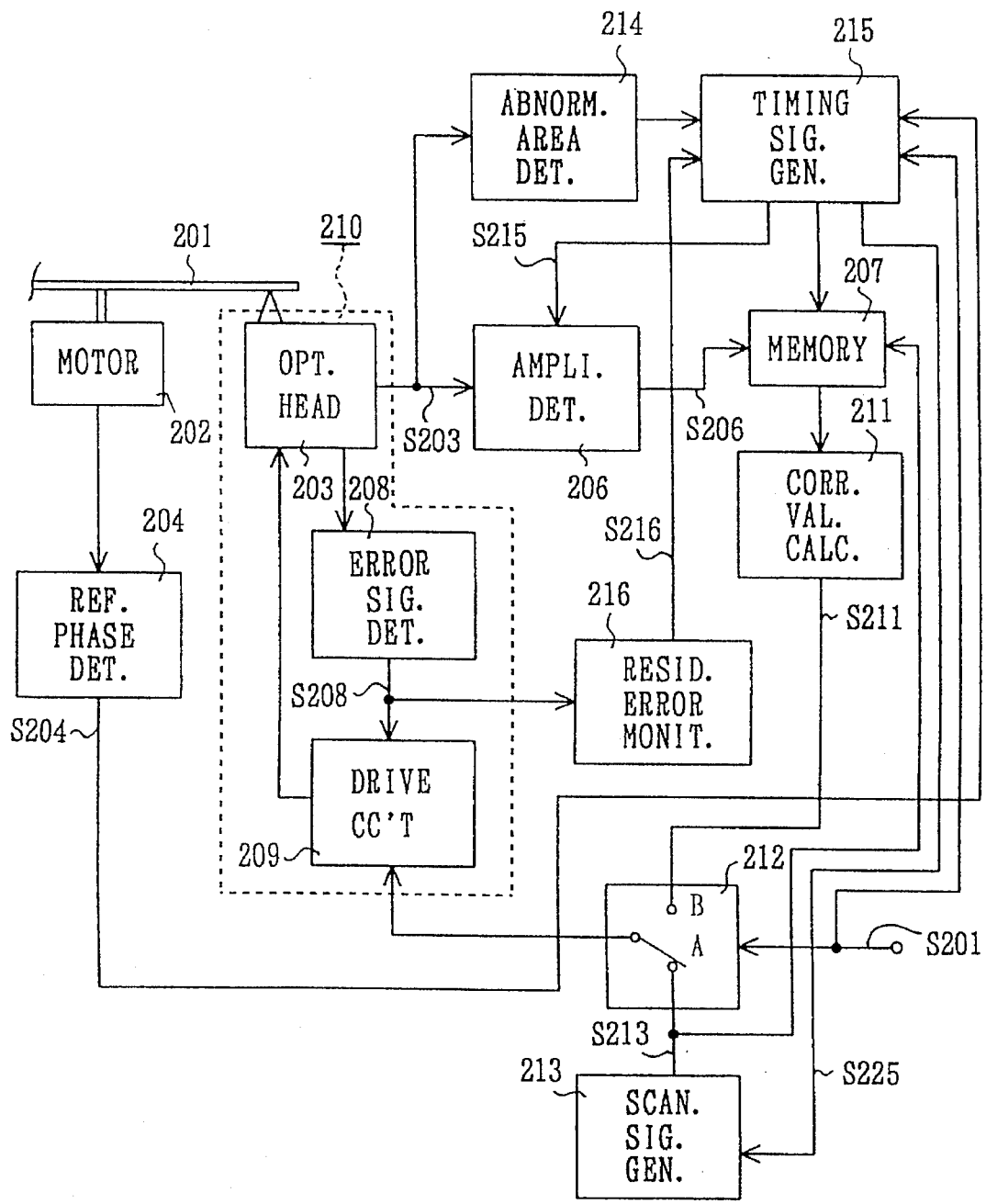
FIG. 8 is a block diagram showing a sixth embodiment of the automatic attitude correcting system for an optical disc device according to this invention.

FIG. 8 is a block diagram showing the sixth embodiment of this invention.

In FIG. 8, an optical disc 201 on which information tracks are spirally or concentrically formed is rotated by a motor 202, and it is optically reproduced with a laser beam emitted from an optical head 203. The optical head has an optical system containing a laser source, an objective lens, etc., a mechanism system for moving the lens, a photodetector, all of them are not shown in FIG. 8 as they are conventional elements, the photodetector detects a light reflected from the optical disc 201.

The laser beam emitted from the optical head 203 is focused by the objective lens in the optical head 203 so as to form a beam spot on the optical disc 201. In the focus control, the objective lens is moved in a direction perpendicular to the surface of the optical disc by an unshown focus actuator.

The tracking control is performed so that the beam spot is displaced so as to cross a center line of the information track of the optical disc 201. The tracking control is performed by utilizing a tracking error signal which corresponds to a relative positional displacement of the beam spot from the center line of the track as the objective lens is moved in a radial direction of the optical disc 201 by an unshown tracking actuator.

In addition, a tilt control is performed so that an optical axis of the laser beam is kept perpendicular to the surface of the optical disc. This tilt control is performed by detecting a tilt signal corresponding to the deviation (tilt) of the optical axis of the laser beam from a norm on the basis of the output of the photodetector or the like, and the whole optical head 203 is inclined in accordance with the tilt error signal.

A focus error signal, a tracking error signal, a tilt error signal, etc. are detected by an error signal detection unit 208, and the focus actuator, the tracking actuator and a tilt correction mechanism are driven on the basis of the above error signals.

A case where the focus control is performed with the attitude control mechanism will be exemplary described hereunder.

In the focus control, a focus error signal S208 is outputted from the error signal detection unit 208, and the control mechanism driving circuit 209 supplies a current to a driving coil of the focus actuator of the optical head 203 in response to the focus error signal S208.

In FIG. 8, a focus error signal S208 is detected on the basis of the output of the photodetector of the optical head 203 or a signal from an unshown error detection unit provided in the optical head 203. This focus error signal S208 is a control error signal indicating a residual control error in an attitude control mechanism 210 which houses the optical head 203, the error signal detection unit 208 and the control mechanism driving circuit 209 for controlling the attitude of the objective lens or alternatively an attitude of the attitude control mechanism 210 itself.

Thus the attitude control mechanism 210 serves to control the relative attitude of the objective lens with respect to the optical disc 201.

In this embodiment, the control error signal S208 is a focus error signal which is outputted on the basis of the output from the photodetector of the optical head 203, and it is supplied to the control mechanism driving circuit 209 and an residual error monitoring unit 216. A current corresponding to the focus error signal S208 is supplied from the control mechanism driving circuit 209 to a driving coil of the focus actuator, and the residual error monitoring unit 216 detects whether an AC component of the focus error signal S208 is substantially equal to zero. The detected result is supplied as a signal S216 to a timing signal generating circuit 215.

In FIG. 8, a reference phase signal S204 is outputted at one rotational angle of the motor 202 or the optical disc 201. The reference phase signal S204 is outputted once per one-revolution of the optical disc 201, and is supplied to the timing signal generating circuit 215.

From the timing signal generating circuit 215, a signal S225 which is synchronized with the reference phase signal S204 and a sampling pulse S215 which is delayed from the signal S225 by a time Ts, are outputted. These signals are shown in FIG. 9.

Figure 9:
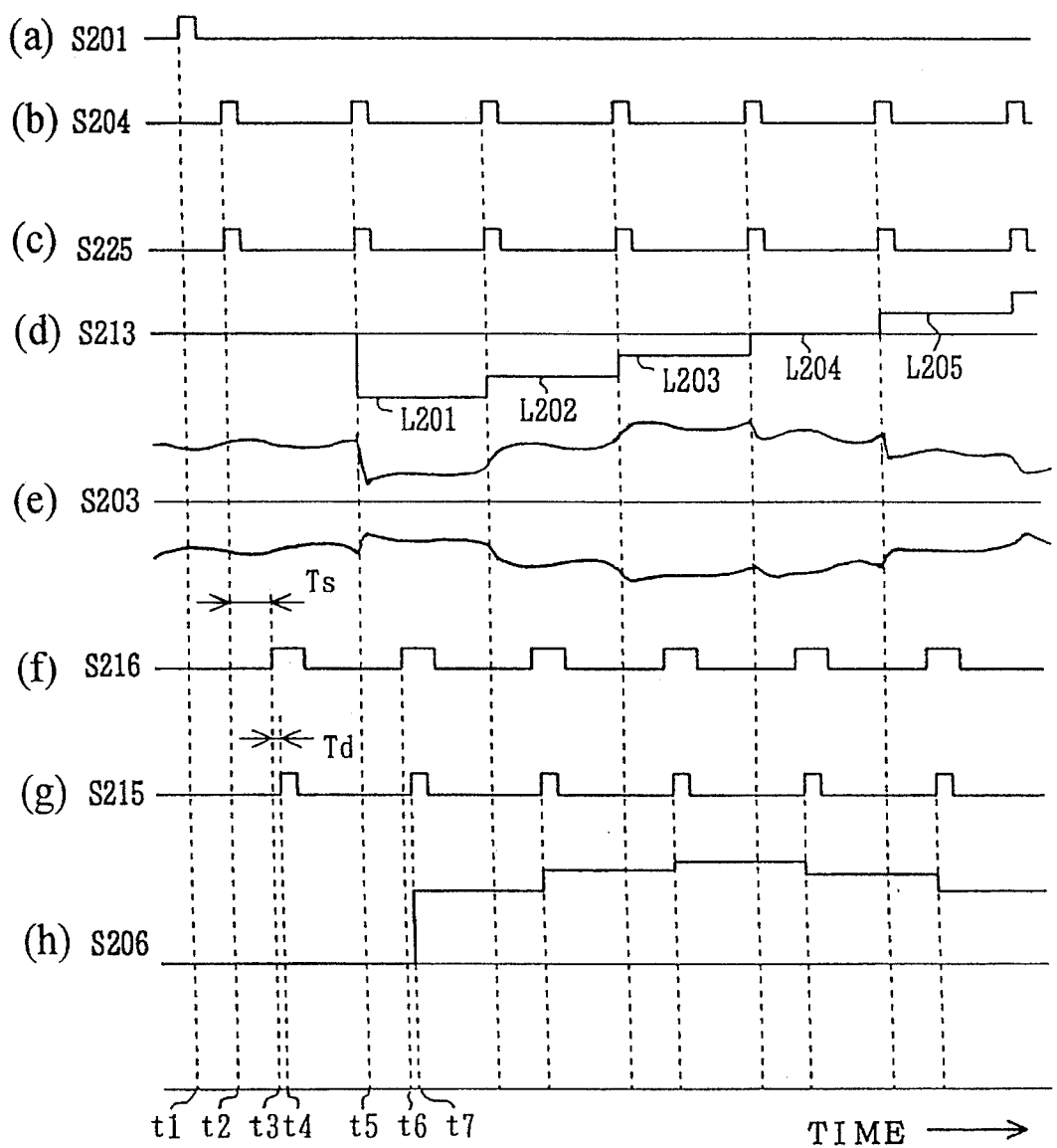
FIG. 9 is a time chart for a signal of each part of the automatic attitude correcting system shown in FIG. 8.

FIG. 9 is a time chart for the signals of the respective parts of the automatic attitude correcting system shown in FIG. 8.

In FIG. 9, when the automatic correction start signal S201 is supplied to the switch 212 and the timing signal generating circuit 215, the calculation of a correction signal to be supplied to the attitude control mechanism 210 at the reproduction of the optical disc is started.

At the setting time of the correction signal in the automatic correction, the optical disc device is set to a still picture reproduction mode or a normal reproduction mode. When a correction start signal S201 is inputted at a time t1, the memory 207 is reset, and the switch 212 is switched to an A-side. Thereafter, a scanning signal S213 as shown in FIG. 9 is supplied to the memory 207, and also supplied through the switch 212 to the control mechanism driving circuit 209.

As shown in FIG. 9, the scanning signal S213 is a signal whose voltage varies like L201, L202, L203, . . . at a predetermined step difference as time progresses, and its level is varied in synchronization with the signal S225 at every one revolution of the optical disc 201.

Further, the control error signal S208 outputted from the error signal detection unit 208 is supplied to the residual error monitoring unit 216. In the residual error monitoring unit 216, the outputted signal S216 is set to an H level when the magnitude of the AC component of the control error signal S208 is below a predetermined value i.e. substantially zero.

At the setting time of the correction signal, the level of the scanning signal S213 is set to zero, and a disc rotational angle at which the AC component of the control error signal S208 is substantially equal to Zero iS detected. In FIG. 9, a time t3 corresponds to this timing. Subsequently, the signal S216 is outputted at the same rotational angle, and a sampling pulse S215 which is delayed from the signal S216 by a time Td is outputted. Usually, the time Td is set to zero.

In the amplitude detection unit 206, the amplitude of the RF reproduction signal S203 outputted from the optical head 203 is sampled and held in synchronization with the sampling pulse S215, and its value is stored in the memory 207.

In the amplitude detection unit 206, the amplitude of the RF reproduction signal S203 is first detected in synchronization with the sampling pulse S215 (at a time t7) for a level L201 of the scanning signal S213, and stored in the memory 207. The memory 207 iS supplied with the scanning signal S213, and also supplied, through a timing signal generating circuit 215, with a signal corresponding to an output of an abnormal area detection unit 214.

Subsequently, the level of the scanning signal S213 is altered to L202, and in the amplitude detection unit 206, the amplitude of the RF reproduction signal S203 is detected in synchronization with the sampling pulse S215 and is stored in the memory 207. Subsequently, the amplitude of the reproduction scanning signal S213 is detected at a substantially constant rotational angle in the same manner as described above, and is stored in the memory 207.

The level of the scanning signal S213 and the amplitude of the RF reproduction signal S203 are stored in a pair in the memory 207, and the content of the memory 207 is supplied to a correction value calculating unit 211. When the amplitude of the RF reproduction signal S203 is detected for all the levels of the scanning signal S213 on the basis of the data supplied to the correction value calculating unit 211, the correction value calculating unit 211 calculates the level of the scanning signal S213, which causes to maximizes the amplitude of the RF reproduction signal "203. The level of the scanning signal S213 thus calculated is stored as a correction signal S211 in a memory within the correction value calculating unit 211.

In the reproducing operation, the switch 212 is switched to the a B-side, and the correction signal S211 stored in the memory is supplied to the control mechanism driving circuit 209 of the attitude control mechanism 210.

At the time of the determination of the optimum correction signal value in the correction value calculating unit 211, the correction value is determined from predetermined levels of the scanning signal 213 which are preliminary determined when the step difference of the scanning signal S213 is small enough. However, when the step difference of the scanning signal 213 is large, the estimation calculation using the function approximation as mentioned previously for the embodiment 1 is performed on the basis of the value of the scanning signal 213 and the detected amplitude value in the correction calculating unit 211, thereby calculating the correction value with higher precision.

When the correction signal value is set in the automatic attitude correction system of the optical disc device, an area on the optical disc 201 where any abnormality due to scratches, dust or the like occurs is present, is detected in the abnormal area detection unit 214. When the amplitude value of the RF reproduction signal S203 which is reproduced from the abnormal area is stored in the memory 207 in synchronization with the sampling pulse S215, the amplitude value at the rotational angle involving this area is not used to calculate the correction value, and the angle for sampling the RF reproduction signal S203 is changed. Specifically, the sampling pulse S215 is generated while delayed from the signal S216 by a time Td, and the sampling is carried out in synchronization with the sampling pulse S215.

The abnormal area detection unit 214 is supplied with the RF reproduction signal S203, and a rotational angle at which any abnormal area is present is detected on the basis of a fluctuation rate of an envelope of the RF reproduction signal S203. If the timing of the sampling pulse S215 is within the rotational angle at which the abnormal area is present, an abnormal area detection signal is outputted from the abnormal area detection unit 214.

According to the sixth embodiment shown in FIG. 8, the correction signal is produced when the amplitude of the RF reproduction signal S203 is detected at such a rotational angle of the optical disc 201 where the AC component of the control error signal outputted from the error signal detection unit 208 is detected to be substantially zero, thus produced correction signal is supplied to the attitude control mechanism 210, so that the maximum value of the defocus amount for the correction signal is limited to a small value, and the excellent tracking correction can be performed over the whole revolutionary range of the optical disc.

In the scanning signal generating unit 213, L200 which is a median between the maximum and minimum levels of the scanning signal S213 is not equal to zero, and it may be set to a correction value which has been determined at a previous correction value setting time. That is, similar optical characteristics are obtained between different tracks insofar as these tracks are located close each other. Therefore, if the correction value which is set at the previous correction value setting time is set to the median L200, there occurs no risk that the attitude control mechanism is out of a controllable area during the correction value setting, and the precision of the correction signal can be improved by reducing the step difference of the scanning signal. Further, it is sufficient to perform the detection of the amplitude of the RF reproduction signal S203 for only the scanning signal level which is close in value to the median L200. Therefore, the correction signal can be calculated at a high speed.

[SEVENTH EMBODIMENT]

A seventh embodiment of the automatic attitude correcting system according to the present invention will be described with reference to FIG. 10.

Figure 10:
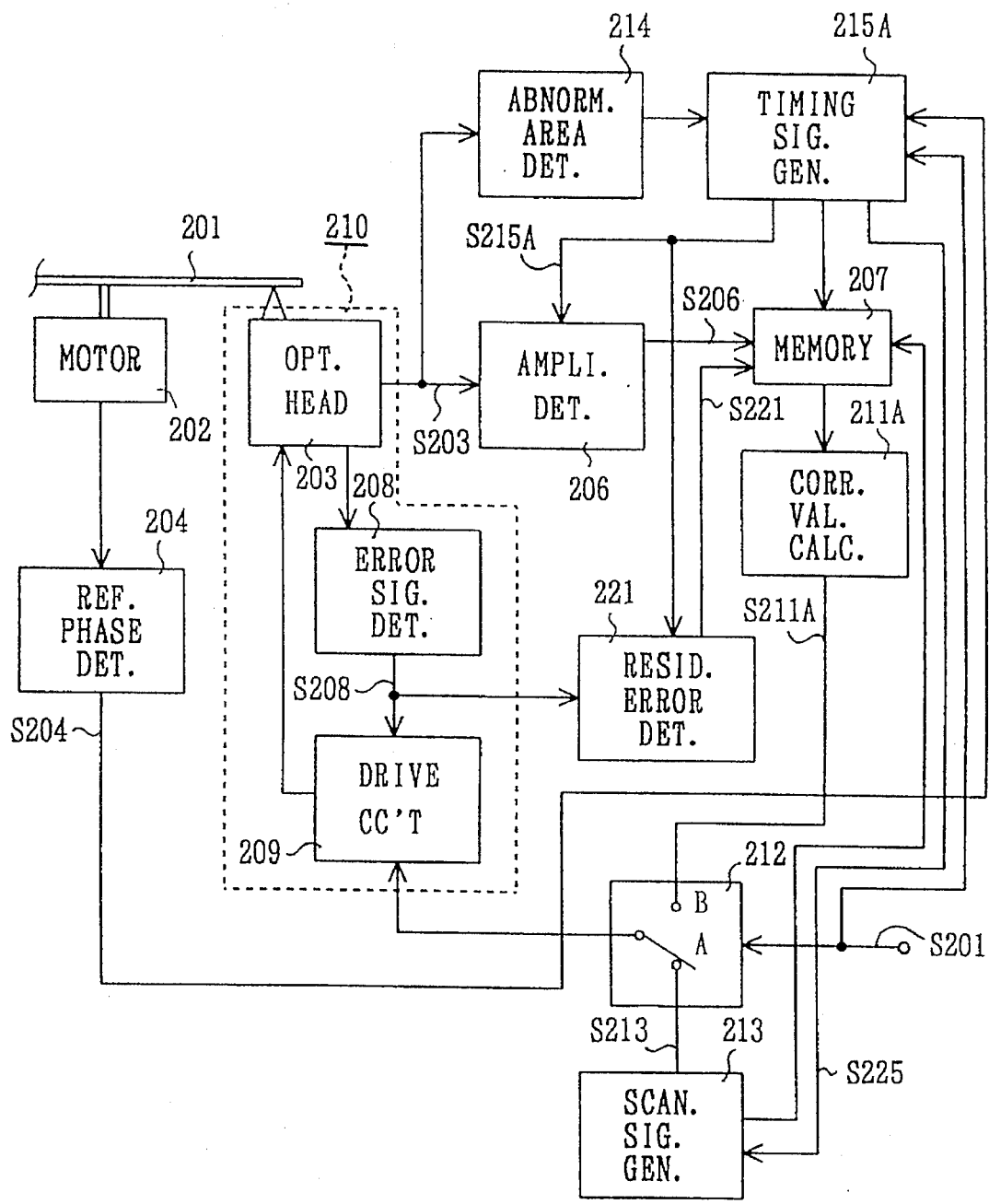
FIG. 10 is a block diagram showing a seventh embodiment of the automatic attitude correcting system for an optical disc device according to this invention.

In FIG. 10, those elements which have the same construction and functions as shown in FIG. 8 are represented by the same reference numerals, and the description thereof is thus omitted in the following description.

The major difference between the seventh embodiment shown in FIG. 10 and the sixth embodiment shown in FIG. 8 resides in a timing signal generating circuit 215A, a correction value calculating unit 211A and a residual error detection unit 221 of FIG. 10.

In FIG. 10, a procedure for setting the correction value in the automatic correction process is substantially identical to that of the sixth embodiment shown in FIG. 8. However, in a timing signal generating circuit 215A, a sampling pulse S215A which is used to detect the amplitude of the RF reproduction signal S203 in the amplitude detection unit 206 is outputted at a constant rotational angle of the optical disc 201 or motor 202, and its timing is irrespective of the control error signal of the attitude control mechanism 210.

The residual error detection unit 221 serves to detect the AC component of the control error signal S208 outputted from the error signal detection unit 208, and the amplitude and polarity thereof are supplied to the memory 207.

In the residual error detection unit 211A, a DC component of the control error signal S208 is removed by a high-pass filter not shown. The amplitude and polarity of an AC component thus obtained is sampled in synchronization with the sampling pulse S215A, and the values thereof are stored in the memory 207.

The amplitude of the RE reproduction signal S203 is detected in synchronization with the sampling pulse S215A in the amplitude detection unit 206, and stored in the memory 207. The value of the scanning signal S213 at that time is also stored in the memory 207.

Through the above operation, the amplitude value of the RE reproduction signal S203, and the residual control error at the time when the above amplitude value is detected is stored in the memory 207 at every level of the scanning signal S213. Thereafter, the value of the scanning signal S213, the amplitude of the BE reproduction signal S203 for the value of the scanning signal S213 and the AC component of the control error signal are supplied from the memory 207 to the correction value calculating unit 211A.

In the correction value calculating unit 211A, the maximum value of the plural amplitude values of the RF signal S203 stored in the memory 207 is detected, and the correction signal S211A is calculated on the basis of the level of the scanning signal S213 at which the maximum value is obtained, and the residual control error at that time.

That is, in the correction value calculating unit 211A, the residual control error at the time when the maximum amplitude is detected is subtracted from the level of the scanning signal S213 which provides the maximum amplitude value of the RF reproduction signal 8203 to calculate the correction signal S211A, and the result is supplied to the switch 212.

In this case, no problem would occur if the level of the scanning signal S213 is varied with a small enough step difference in the scanning signal generating unit 213. However, if the step difference is large and the number of the sampled amplitude values is small, the function approximation is performed by using these values to calculate for more accurate correction value. That is, the approximate function to which a small number of data are conformed is calculated, and the correction signal value S211A maximizing the amplitude of the RF reproduction signal S203 is estimated on the basis of the approximate function.

On the other hand, the abnormal area detection unit 214 is supplied with the RF reproduction signal S203 reproduced from the same track turn at all times, and an area providing the RF reproduction signal S203 having an envelope whose differential waveform having an amplitude above a predetermined value, is determined to be an abnormal area on the optical disc 201.

If a rotational angle of the optical disc 201 at which the sampling pulse S215A is outputted is included in the disc rotational angle at which the abnormal area is present, the time difference between the signal S204 and the signal S215A is slightly altered, and the detection of the amplitude of the RF reproduction signal S203 is carried out again, so that the correction signal S211A is detected while avoiding the abnormal area.

When the correction signal S211A is determined, the output terminal of the switch 212 is switched to the B-side, and during the reproducing operation of the optical disc device, the calculated correction signal S211A is supplied to the control mechanism driving circuit 209 at all times, whereby the control offset of the optical disc device due to various kinds of factors is corrected and the focus control is accurately performed.

Since the correction signal S211A is determined not subjected by the residual control error, there is no possibility of an increase of the residual control error due to the supply of the correction signal to the attitude control mechanism 210. Accordingly, the control error signal is varied substantially around zero. Therefore, the maximum value of the residual control error in the reproducing operation can be suppressed to a small value.

In the sixth and seventh embodiments, the focus control is performed by the attitude control mechanism 210. The same effect can be obtained in a case of performing the tracking control and the tilt control.

Further, the automatic attitude correcting operation is not necessarily conducted in a still picture reproduction mode, and it may be carried out over a plurality of tracks in the normal reproducing mode.

Still further, the detection of an abnormal area by the abnormal area detection unit 214 may be performed before the detection of the amplitude of the RF reproduction signal S203 by the amplitude detection unit 206.

According to the sixth and seventh embodiments of the automatic attitude correcting system of this invention, the correction signal value is set with no effect of the residual control error, so that the maximum value of the residual control error in the various kinds of automatic control systems involving the optical head can be suppressed to a small value. In addition, since the load imposed on the CPU when the correction signal value is set is light, the correction signal can be easily revised during the reproducing operation.

What is claimed is:

1. Automatic attitude correcting system adapted to be used on an optical disc device, said optical disc device using optical head means for reading information recorded on an optical disc which is revolving, said system correcting an attitude of said optical head means, said system comprising:

attitude control means for controlling said attitude of said optical head means with respect to the optical disc;

angular position indicating means for outputting a positional signal indicating an angular position of the optical disc;

scanning signal generating means for generating a scanning signal and for supplying the scanning signal to said attitude control means, where a DC level of the scanning signal varies stepwise at a predetermined interval;

amplitude detecting means for detecting an amplitude of an output of said optical head means in response to said positional signal;

correcting value calculation means for generating a correcting value calculated from an output of said amplitude detecting means and for supplying the correcting value to said attitude control means causing said amplitude detecting means to generate a maximum output from said amplitude detecting means.

2. Automatic attitude correcting system as claimed in claim 1, in which said angular position indicating means outputs said positional signal at a desired angular position of the optical disc, and said amplitude detecting means detects the amplitude of said output of the optical head means reproduced thereby from one of first and second predetermined angular areas which are close to each other on said optical disc.

3. Automatic attitude correcting system as claimed in claim 1, wherein said attitude control means comprises error signal detecting means for detecting an attitude error signal included in the output of the optical head means and for outputting a control error signal, and wherein said system further comprises residual error detecting means for detecting an AC component of said control error signal.

4. Automatic attitude correcting system as claimed in claim 3, wherein said residual error detecting means detects one of first and second statuses of which the first status is that said AC component is substantially zero, and the second status is that the AC component of said control error signal is other than substantially zero, and wherein said amplitude detecting means detects the amplitude of the output of the said optical head means in said first status.

5. Automatic attitude correcting system as claimed in claim 3, wherein said correcting value calculation means generates the correcting value calculated from an output of said residual error detecting means and said scanning signal which causes an output of said amplitude detecting means to become maximum, and wherein said correcting value calculation means supplies the correcting value to said attitude control means.

6. Automatic attitude correcting system as claimed in claim 1, wherein said angular position indicating means outputs said positional signal at every predetermined position of said angular position, said every predetermined position being obtained by dividing angularly one complete circle of the optical disc by a predetermined number, and wherein said amplitude detecting means detects said amplitude of the output of said optical head in response to said positional signal and said scanning signal at said every predetermined position.

7. Automatic attitude correcting system as claimed in claim 6, wherein said correcting value is supplied to said attitude control means at said every predetermined position.

8. Automatic attitude correcting system as claimed in claim 6, wherein said correcting value calculation means comprises estimating means for estimating an optimum correcting value for another angular position than said every predetermined position, said optimum correcting value being calculated from said correcting value for said every predetermined position, and wherein said estimating means supplies said optimum correcting value to said attitude control means.

9. Automatic attitude correcting system as claimed in claim 6, wherein said correcting value calculation means supplies to said attitude control means with an averaged value of said correcting value obtained at said every predetermined position.

10. Automatic attitude correcting system as claimed in claim 6, wherein said correcting value calculation means supplies to said attitude control means with a median of maximum and minimum values of said correcting value obtained at said every predetermined position.

11. Automatic attitude correcting system as claimed in claim 6, wherein said amplitude detecting means further comprises a one-revolution amplitude detector for detecting said output of the optical head means for substantially one revolution of the optical disc at every step of said DC level of the scanning signal.

12. Automatic attitude correcting system as claimed in claim 6, wherein said scanning signal generating means comprises memory means for storing a value of said scanning signal, said value stored in said memory means being utilized in a succeeding operation of said system.

13. Automatic attitude correcting system as claimed in claim 6, wherein said amplitude detecting means detects said amplitude of the output of said optical head which is located at substantially constant radial distance from a center of the optical disc.

14. Automatic attitude correcting system as claimed in claim 1, wherein said system further comprises abnormal area detection means for detecting a signal reproduction abnormal area on the optical disc and outputting an abnormality detected signal, and wherein said abnormality detected signal causes said amplitude detecting means to detect the amplitude of the output of said optical head means which reproduces the information recorded on an area other than said signal reproduction abnormal area.

\* \* \* \* \*